United States Patent [19]
Marsh

[11] 3,722,281
[45] Mar. 27, 1973

[54] LIQUID HEIGHT GAUGE

[75] Inventor: Lawrence B. Marsh, Silver Spring, Md.

[73] Assignee: Engineering Physics Company, Rockville, Md.

[22] Filed: Nov. 4, 1970

[21] Appl. No.: 86,676

[52] U.S. Cl. ............................................. 73/304 R
[51] Int. Cl. ............................................. G01f 23/22
[58] Field of Search .......................... 73/304, 290

[56] References Cited

UNITED STATES PATENTS

| | | | |
|---|---|---|---|
| 3,465,588 | 9/1969 | Slavin | 73/304 |
| 2,648,058 | 8/1953 | Breedlove | 73/304 |
| 3,058,345 | 10/1962 | Mastras | 73/304 |
| 3,402,607 | 9/1968 | Cambillard | 73/304 |
| 3,549,992 | 12/1970 | Reinhart | 73/304 |

*Primary Examiner*—Louis R. Prince
*Assistant Examiner*—Denis E. Corr
*Attorney*—Snyder and Burtrum

[57] ABSTRACT

A primary means comprises a coil wrapped around a support member, a secondary means including a coil also wrapped around said support member and adjacent said primary coil. The primary coil is insulated from the liquid and the secondary coil is exposed to the liquid. The secondary means includes a second remote member which is also exposed to the liquid and a voltage is developed between the first and second secondary members. The primary coil is connected with an a.c. source and induces an alternating voltage in the secondary coil. An indicating means indicates the voltage developed between the secondary members which is proportional to the level of liquid in contact with the two secondary members.

14 Claims, 6 Drawing Figures

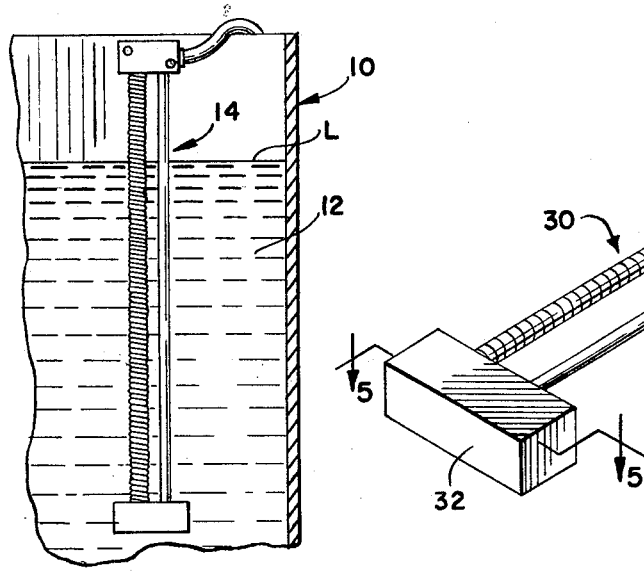
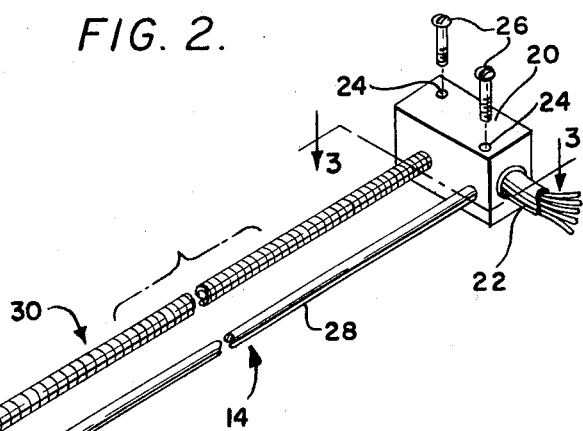
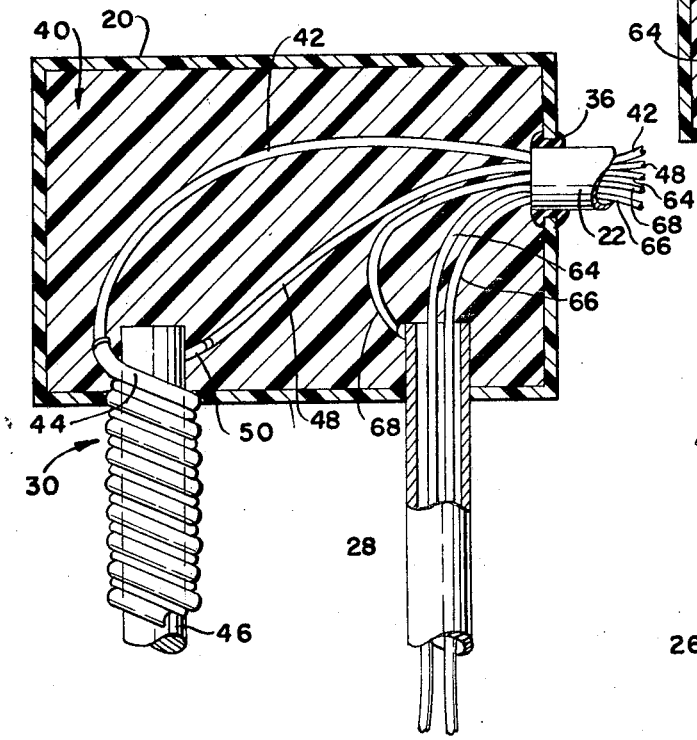
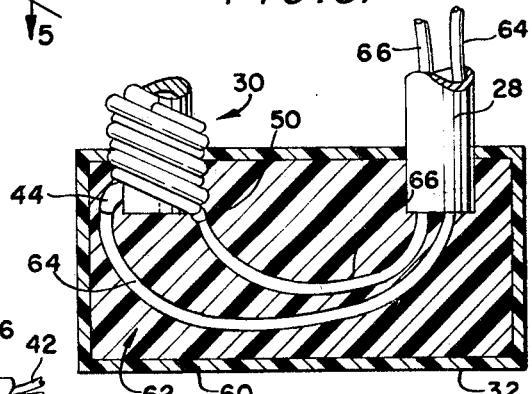
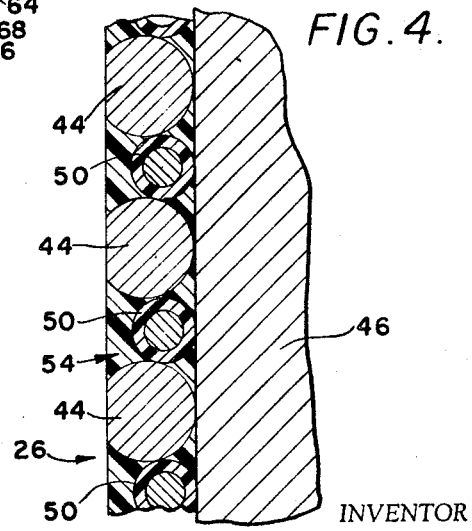
INVENTOR
LAWRENCE B. MARSH

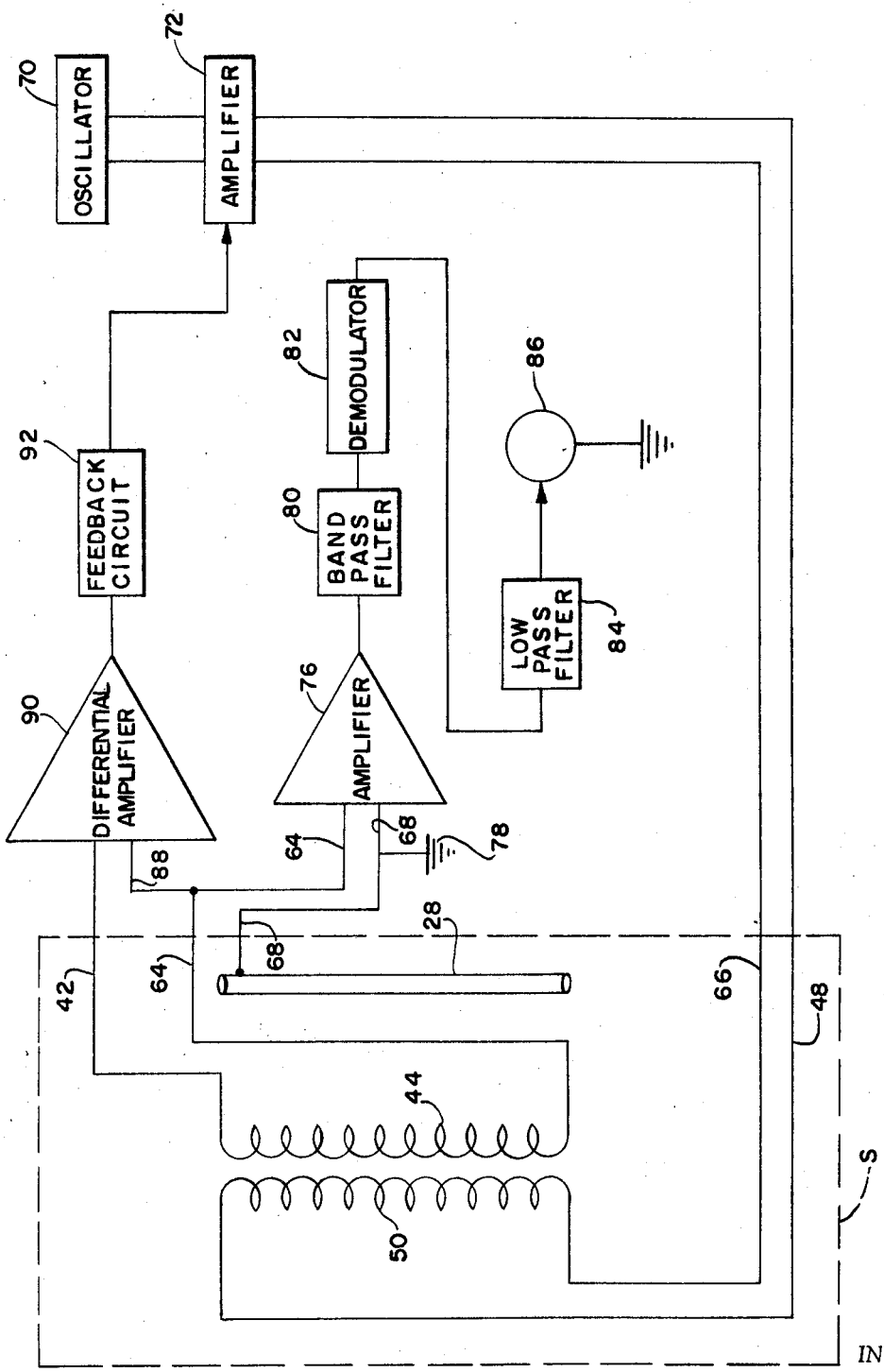

LIQUID HEIGHT GAUGE

BACKGROUND OF THE INVENTION

The present invention relates to a liquid height gauge useful for measuring the height of liquid within a container as well as the level measurement of waves, tide, and water stages of rivers, lakes, estuaries and oceans. The device is suitable for use in measuring the height of fresh water, salt water, or molten metals and the like.

Conventional liquid height gauges have a number of disadvantages which cause them to produce inaccurate and unacceptable readings under certain circumstances. Many known liquid height gauges provide outputs which are dependent on the electrical conductivity of the liquid being measured. This is a significant drawback since it is desirable to provide a liquid height gauge which is insensitive to the salinity of the liquid and which will maintain its accuracy over the full range from fresh water to extremely saline water. Since the conductivity of the liquid may vary, those gauges the outputs of which are dependent on the electrical conductivity of the liquid being measured do not give satisfactory results.

Prior art liquid height gauges are usually dependent upon the temperature of the liquid which is not desirable since the temperature of the liquid may vary within relatively wide ranges in certain applications.

A further problem occurring with known liquid height gauges is the fact that the portions of the gauge out of the liquid often become wet, providing false readings. Additionally, in case of gauges employed with salt water, the salt may cake on the exposed portions of the gauge above the liquid level providing false readings.

SUMMARY OF THE INVENTION

In the present invention, at least two spaced electrically conductive members are provided for directly physically contacting the liquid the height of which is to be measured. Means is provided for producing an electromotance gradient along the length of one of the members, and indicating means is electrically connected with the members for indicating the height of the liquid. These two members comprise secondary means.

A primary means includes a coil connected with an a.c. source for producing alternating magnetic flux in the primary coil which in turn induces an alternating voltage in an adjacent said secondary member which is also in the form of a coil. In this way there is induced in said adjacent secondary member an electromotance in the secondary proportion to the number of turns in the secondary coil. The secondary coil is wound with a certain number of turns per unit length, and accordingly there is developed in the secondary coil an electromotance per unit length or an electromotance gradient which is proportional to the number of turns per unit length on the secondary coil. A voltage is developed between the two secondary members, and this voltage is proportional to the height of the liquid in contact with the secondary members. The liquid effectively acts as a "shorting bar" and liquid level measurements can be made with any liquid having an electrical conductivity comparable to or greater than that of fresh water.

In order for the device to operate accurately, the induced voltage across the entire length of the secondary member adjacent the primary coil should be constant. This is accomplished in the present invention by providing a feed-back circuit connected with said last mentioned secondary member for controlling the a.c. voltage impressed on the primary coil.

The present invention is based on the principles of electromagnetic induction. The device has no moving parts, is linear and is capable of accuracies better than 1 percent of full scale. The principle of operation makes it insensitive to the salinity of the liquid being measured and its accuracy is maintained over the full range from fresh water to extremely saline water as well as in molten metals and the like. The device rapidly follows the changes in liquid level.

The liquid height gauge of the present invention is substantially independent of the electrical conductivity of the liquid being measured and is also substantially temperature independent. Liquid or salt residue on the portions of the gauge extending above the liquid level do not produce erroneous readings as in the prior art. The sensing portion of the gauge can be made of virtually any length, thereby enabling it to be readily employed in diverse applications.

BRIEF DESCRIPTION OF THE DRAWINGS

FIG. 1 is a view illustrating the sensing portion of the gauge mounted on the wall of a tank for measuring the height of the liquid in the tank;

FIG. 2 is a top perspective view of the sensing portion of the gauge;

FIG. 3 is an enlarged sectional view taken substantially along line 3—3 of FIG. 2 looking in the direction of the arrows;

FIG. 4 is an enlarged sectional view through a portion of the structure shown in FIG. 3;

FIG. 5 is an enlarged sectional view taken substantially along line 5—5 of FIG. 2 looking in the direction of the arrows; and, FIG. 6 is a schematic line diagram illustrating the electrical components of the liquid height gauge of the present invention.

DESCRIPTION OF THE PREFERRED EMBODIMENTS

Referring now to the drawings wherein like reference characters designate corresponding parts throughout the several views, a portion of a container is indicated by reference character 10 in FIG. 1 of the drawings and has a body of liquid 12 disposed therewithin, this body of liquid having an upper liquid level L the height of which is desired to be measured. The sensing means indicated generally by reference character 14 is suitably secured to the wall of the tank, and the lower portion of the sensing means is immersed in the liquid.

Referring now to FIG. 2 of the drawings, the sensing means 14 includes an upper housing 20 into which extends a waterproof cable or transmission line 22 having a plurality of electrical leads therein as hereinafter described. Housing 20 is provided with suitable holes 24 for receiving members such as screws 26 for securing housing 20 to a support member such that the remaining parts of the sensing portion of the gauge may extend downwardly into the liquid being measured.

A secondary member 28 extends from housing 20 and a primary and secondary coil assembly 30 also extends from housing 20, the opposite ends of parts 28 and 30 being received within a second lower housing 32.

Referring now to FIG. 3, housing 20 is formed of a suitable insulating material such as Bakelite and is hollow. Cable 22 extends through a grommet 36 mounted in a hole in the side wall of the housing, the entire interior of the housing being filled with a body of insulating potting compound indicated by reference character 40, this potting compound filling the entire interior of the housing after the various electrical members have been inserted in place therein.

Cable 22 includes a first lead 42 extending within the housing and connected with one end of the first electrically conductive secondary member 44 in the form of a wire, this wire being helically wound around a structural support member 46 such as a rod formed of metallic material which can be iron or the like, and which is relatively rigid. A second lead 48 is connected with one end of an electrically conductive primary member 50 in the form of an insulated wire which is also helically wound around support member 46, wires 44 and 50 being wound so as to be closely adjacent one another.

As seen in FIG. 4, uninsulated wire 44 and insulated wire 50 are wound on the outer surface of support member 46, the diameter of insulated wire 50 being substantially less than that of the uninsulated wire 44. After the wires are wound on the support member, both of the wires are embedded within and surrounded by a potting compound indicated by reference character 54 to provide a smooth outer substantially cylindrical surface. The entire assembly is then sanded or otherwise suitably treated so as to remove the outermost portion of the assembly so as to expose the outer peripheral portions of wire 44 as indicated in FIG. 4.

As seen in FIG. 3, the upper ends of member 28 as well as assembly 30 are received through holes formed in the bottom wall of housing 20 and extend into the body of the potting compound 40. In this manner, the depending parts of the sensing means are retained in operative position and have a completely waterproof connection with respect to housing 20.

Referring now to FIG. 5, the lower ends of secondary member 28 and assembly 30 extend through suitable holes provided in the upper wall of a hollow housing 60 similar to housing 20. Housing 60 is filled with a body of insulating potting compound 62 which is disposed in operative position after the components have been assembled as illustrated. The lower ends of wires 44 and 50 are connected with leads 64 and 66 respectively which pass upwardly through the lower open end of secondary member 28 which is a hollow metallic rod formed of a suitable electrically conductive material such as stainless steel or the like which is resistant to corrosion whereby the device may be readily employed in salt water. The upper end of tubular member 28 is connected to a lead 68 provided in cable 22.

Secondary member 28 is shown as being disposed relatively close to the primary and secondary coil assembly 30 whereby it may be supported by housings 20 and 32. Secondary member 28 may also be supported in a suitable manner at a remote point within the metered liquid an arbitrary distance from the primary and secondary coil assembly. In such a case secondary coil member 28 would not be present in FIGS. 1–5. Support member 46 would then be formed as a hollow member and the lower ends of wires 44 and 45 would be connected with leads 64 and 66 extending upwardly through the hollow support member.

Referring now to FIG. 6 of the drawings, the sensing portion of the gauge is indicated by the dashed line S, and the five leads provided in cable 22 are readily identified as extending from the righthand side of the dotted portion S.

An a.c. source comprises an oscillator 70, the output of which is connected with an amplifier 72. The output of the amplifier is in turn connected with leads 48 and 66 previously described so as to impress an a.c. voltage on the primary coil 50 to produce an alternating magnetic flux therein. This will, of course, induce an alternating voltage in secondary coil 44 adjacent thereto. The voltage is developed between the two secondary members 44 and 28, each of which are immersed within the liquid to be measured and are in direct physical contact therewith. Secondary member 28 may be disposed at any suitable position disposed remote from the primary coil 50 whereas coil 44 is preferably disposed closely adjacent to the primary coil.

Secondary members 44 and 28 are connected by leads 64 and 68 respectively to an amplifier 76 forming part of a signal processing unit disposed at some distance from the sensing portion of the gauge. Lead 68 is connected to ground at 78 so as to effectively ground secondary member 28. In actual practice, this connection to ground may not be necessary where the secondary member is immersed in a body of liquid which itself is grounded which might be the case when immersed in sea water.

The output of amplifier 76 is connected with a band pass filter 80 which in turn is connected with a demodulator 82 providing a d.c. output. The d.c. output from the demodulator passes through a low pass filter 84 to an indicating means 86 in the form of a voltmeter or the like. The d.c. signal at the voltmeter is proportional to the level of the liquid being measured in contact with secondary members 28 and 44.

In order for the device to operate accurately, the induced voltage across the entire length of secondary member 44 should be constant. This is accomplished by connecting secondary member 44 by leads 42 and 88 with a differential amplifier 90. The output of this amplifier is connected through a feed-back circuit 92 with amplifier 72 to cause the output of amplifier 72 to be controlled to adjust the a.c. voltage impressed on the primary coil 50 as necessary to insure a constant induced voltage in secondary member 44.

As this invention may be embodied in several forms without departing from the spirit or essential characteristics thereof, the present embodiment is therefore illustrative and not restrictive.

What is claimed is:

1. A liquid height gauge comprising a source of alternating voltage, at least two spaced electrically conductive members for directly physically contacting a liquid the height of which is to be measured, said members comprising secondary means far inductive coupling with said source; primary means including magnetic flux producing means connected to said source for producing an alternating voltage in one member of said secondary means to create an electromotance gradient along the length of said one member; insulating means for insulating said primary means from said secondary means and from the liquid to be measured; and indicating means electrically connected with said members for indicating the height of the liquid.

2. A gauge as defined in claim 2, wherein said primary means comprises a coil, and a source of alternating current connected with said coil for impressing an alternating current on said coil to produce alternating magnetic flux.

3. A gauge as defined in claim 3, wherein said coil is disposed adjacent said one secondary member for producing substantially uniform magnetic flux throughout the length of said one secondary member.

4. A gauge as defined in claim 4, wherein the other of said secondary members is disposed at a position remote from said coil.

5. A gauge as defined in claim 2, including means for insuring a substantially constant voltage in said one secondary member.

6. A gauge as defined in claim 6, wherein said means for insuring a substantially constant voltage includes a source of alternating current connected with said primary means, a feed-back circuit being connected with said one secondary member for controlling the alternating current impressed from said source of alternating current on said primary means.

7. A gauge as defined in claim 2, including support means, said primary means and said secondary means comprising wires wound on said support means and disposed adjacent one another.

8. A gauge as defined in claim 8, including insulating means retaining said wires in operative position, the outer periphery of the secondary wire being exposed for contact with the liquid to be measured.

9. A gauge as defined in claim 8, wherein the other of said secondary members is hollow, said hollow secondary member receiving leads connected with the primary and secondary wires.

10. A gauge as defined in claim 2, wherein said primary means comprises a coil, a source of alternating current connected with said coil for producing alternating magnetic flux in said coil, said coil being disposed adjacent said one secondary member for producing substantially uniform alternating magnetic flux in said one secondary member, and means for insuring a substantially constant voltage in said one secondary member comprising a feed-back circuit connected with said one secondary member for controlling the alternating current impressed on said coil.

11. A liquid height gauge comprising, in combination:
    an elongate, vertically extending electrically conductive member for directly physically contacting an electrically conductive liquid whereby a lower end portion length of the member is immersed in such liquid according to the height of the liquid;
    means for producing a fixed electromotance gradient per unit length of said member whereby to generate current in the electroconductive liquid in which the amplitude of the generated current is linearly proportional to said immersed length of said member; and
    means electrically connected between said member and the liquid for measuring the amplitude of said generated current.

12. A liquid height gauge as defined in claim 11 wherein the last mentioned means comprises a second elongate, vertically extending conductive member disposed in fixed, spaced and parallel relation to the first mentioned member, and indicating means connected between the upper ends of said members.

13. A liquid height gauge as defined in claim 12 wherein the first member is a secondary winding and said means for producing comprises a primary winding inductively coupled with said secondary winding and means for impressing an alternating current on said primary winding.

14. A liquid height gauge as defined in claim 11 wherein said member is a secondary winding, and said means for producing comprises a primary winding inductively coupled with said secondary winding and means for impressing an alternating current on said primary winding.

* * * * *